US012451022B2

(12) United States Patent
Garcia Delgado et al.

(10) Patent No.: US 12,451,022 B2
(45) Date of Patent: Oct. 21, 2025

(54) DYNAMIC CONVERSION OF VR CLASSROOM INTO VR BREAKOUT SESSION

(71) Applicant: INTERNATIONAL BUSINESS MACHINES CORPORATION, Armonk, NY (US)

(72) Inventors: Carolina Garcia Delgado, Zapopan (MX); Sarbajit K. Rakshit, Kolkata (IN); Jeremy R. Fox, Georgetown, TX (US); Neil Delima, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/443,841

(22) Filed: Feb. 16, 2024

(65) Prior Publication Data

US 2025/0265941 A1 Aug. 21, 2025

(51) Int. Cl.
*G09B 5/06* (2006.01)

(52) U.S. Cl.
CPC .................... *G09B 5/065* (2013.01)

(58) Field of Classification Search
CPC ............. G09B 5/10; G09B 5/065; G09B 5/00
See application file for complete search history.

(56) References Cited

U.S. PATENT DOCUMENTS 6,160,987 A * 12/2000 Ho ........................ G09B 5/14
434/323
6,915,104 B2 * 7/2005 Yonezu .................. G09B 5/02
434/350

(Continued)

FOREIGN PATENT DOCUMENTS

| CN | 211827655 U | 10/2020 |
|---|---|---|
| TR | 201703924 A2 | 7/2017 |
| WO | 2018155750 A1 | 8/2018 |

OTHER PUBLICATIONS

Al-Gindy, et al., "Virtually Reality: Development of an Integrated Learning Environment for Education", International Journal of Information and Education Technology, vol. 10. No. 3, Mar. 2020, 5 Pages.

(Continued)

*Primary Examiner* — Peter R Egloff

(74) *Attorney, Agent, or Firm* — Robert R. Aragona

(57) ABSTRACT

An embodiment for dynamically converting a virtual reality (VR) classroom into a VR breakout session is provided. The embodiment may include receiving educational content from a VR educational session and profiles of a plurality of users. The embodiment may also include identifying a topic of the educational content. The embodiment may further include extracting a plurality of real-world use cases relevant to the identified topic from a knowledge corpus. The embodiment may also include in response to determining at least two users have at least one overlapping learning preference, dividing the at least two users into a subgroup. The embodiment may further include converting the VR educational session into a smaller VR breakout session containing at least one real-world use case conforming to the at least one overlapping learning preference. The embodiment may also include displaying the converted VR educational session to the at least two users in the subgroup.

17 Claims, 3 Drawing Sheets

(56) References Cited

U.S. PATENT DOCUMENTS

| | | | | |
|---|---|---|---|---|
| 9,792,826 | B2* | 10/2017 | Ngiam | G09B 7/073 |
| 10,803,674 | B2 | 10/2020 | Kocharlakota | |
| 11,631,228 | B2 | 4/2023 | Fieldman | |
| 11,734,906 | B2 | 8/2023 | Fieldman | |
| 11,756,280 | B2 | 9/2023 | Fieldman | |
| 2009/0325138 | A1* | 12/2009 | Shuster | G09B 5/00 434/350 |
| 2013/0085955 | A1* | 4/2013 | Dugas | G09B 5/00 705/326 |
| 2014/0057242 | A1* | 2/2014 | Sherman | G09B 7/00 434/353 |
| 2018/0068576 | A1* | 3/2018 | Calmon | G09B 5/12 |
| 2019/0088153 | A1* | 3/2019 | Bader-Natal | H04N 7/147 |
| 2019/0139321 | A1 | 5/2019 | Kocharlakota | |
| 2021/0385263 | A1* | 12/2021 | Churchill | H04L 65/4038 |
| 2022/0139056 | A1 | 5/2022 | Fieldman | |
| 2022/0301087 | A1* | 9/2022 | Covell | G09B 7/02 |
| 2023/0095198 | A1 | 3/2023 | Fieldman | |
| 2023/0106652 | A1 | 4/2023 | Fieldman | |
| 2023/0124899 | A1* | 4/2023 | Lu | G06T 15/00 434/322 |

OTHER PUBLICATIONS

Disclosed Anonymously, "Method to alter content of virtual reality based on real world obstacles", IP.com, IPCOM000252984, Feb. 27, 2018, 2 Pages.

Disclosed Anonymously, "Method and System for Infusion of Physical and Dynamic Properties on Voice-based Interaction with Virtual Reality Content", IP.com, IPCOM000270906D, Sep. 9, 2022, 4 Pages.

Disclosed Anonymously, "Method and System for Virtual Reality Content Augmentation Based on the User's Need for Physical Movement", IP.com, IPCOM000264547D, Jan. 5, 2021, 4 Pages.

Disclosed Anonymously, "Multiple Conversation Mechanism in a Virtual Meeting Room", IP.com, IPCOM000270801D, Aug. 18, 2022, 9 Pages.

Gencraft, "AI Art Image and Video Generator What will you create?", https://gencraft.com/, Accessed on Feb. 7, 2024, 7 Pages.

Gibson, Virtual reality, IEEE Potentials, May 1998, 6 Pages.

MINDSDB, Tutorial: how to add AI image generation to your own app, https://mindsdb.com/blog/tutorial-how-to-add-ai-image-generation-to-your-own-app, Accessed Feb. 7, 2024, 15 Pages.

Rogers, et al., "Assessment of STEM e-Learning in an Immersive Virtual Reality (VR) Environment", Computers in Education Journal, vol. 8, Issue 4, Dec. 2017, 9 Pages.

Suma, et al., "Making Small Spaces Feel Large: Infinite Walking in Virtual Reality", ACM, Aug. 9-13, 2015, 1 Page.

Weiss, et al., "Chapter 17—Reality, from virtual to augmented", ScienceDirect, 2021, 31 Pages.

"Global Virtual Training and Simulation Market Size Is Anticipated to Surpass Over $973.4 Billion Mark by 2023", Zion Market Research, Mar. 24, 2023, 7 pages.

* cited by examiner

DYNAMIC CONVERSION OF VR CLASSROOM INTO VR BREAKOUT SESSION

BACKGROUND

The present invention relates generally to the field of computing, and more particularly to a system for dynamically converting a virtual reality (VR) classroom into a VR breakout session.

In a VR collaboration setting, participants typically wear VR headsets or other VR devices to enter a virtual space or room. VR facilitates the communication between individuals who may be physically separated in different geographical locations but nevertheless are virtually connected. In the VR environment, the participants are represented by avatars or other digital representations of themselves, allowing the participants to see and interact with each other within the VR environment. A VR classroom is a digital learning environment that uses VR technology to simulate a traditional classroom setting. The VR classroom enables students to immerse themselves in a virtual space and interact with a variety of content.

SUMMARY

According to one embodiment, a method, computer system, and computer program product for dynamically converting a virtual reality (VR) classroom into a VR breakout session is provided. The embodiment may include receiving educational content from a VR educational session and profiles of a plurality of users in the VR educational session. The embodiment may also include identifying a topic of the educational content. The embodiment may further include extracting a plurality of real-world use cases relevant to the identified topic from a knowledge corpus based on the identified topic and the profiles. The embodiment may also include in response to determining at least two users have at least one overlapping learning preference based on the profiles, dividing the at least two users having the at least one overlapping learning preference into a subgroup. The embodiment may further include converting the VR educational session into a smaller VR breakout session containing at least one real-world use case conforming to the at least one overlapping learning preference of the at least two users in the subgroup. The embodiment may also include displaying the converted VR educational session to the at least two users in the subgroup.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
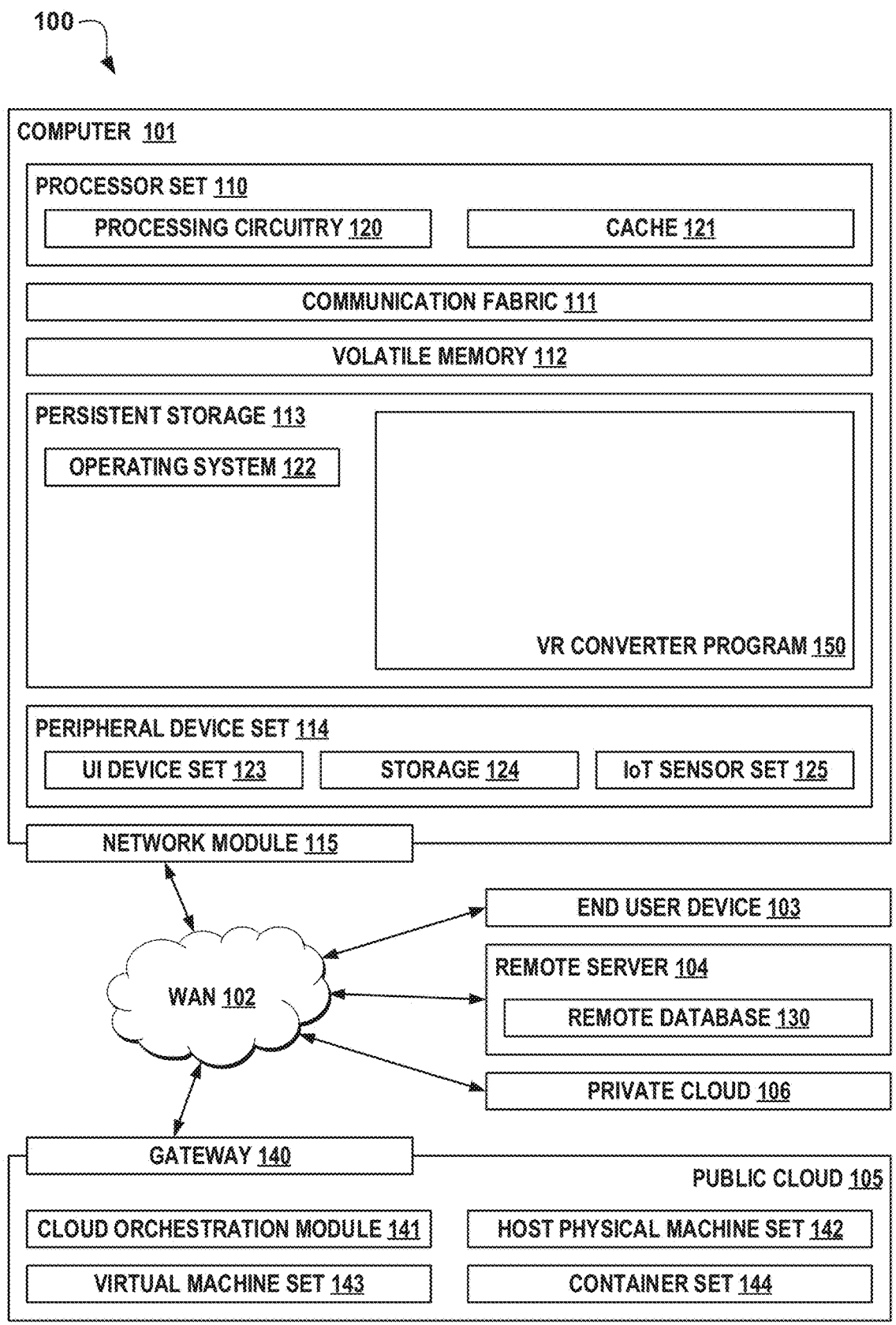
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamically converting a virtual reality (VR) classroom into a VR breakout session. The following described exemplary embodiments provide a system, method, and program product to, among other things, extract a plurality of real-world use cases relevant to an identified topic from a knowledge corpus based on the identified topic and profiles of a plurality of users and, accordingly, in response to determining at least two users have at least one overlapping learning preference, converting a VR educational session into a smaller VR breakout session containing at least one real-world use case conforming to the at least one overlapping learning preference of the at least two users in a subgroup. Therefore, the present embodiment has the capacity to improve VR technology by dynamically converting a VR classroom into a smaller VR breakout session based on educational content.

As previously described, in a VR collaboration setting, participants typically wear VR headsets or other VR devices to enter a virtual space or room. VR facilitates the communication between individuals who may be physically separated in different geographical locations but nevertheless are virtually connected. In the VR environment, the participants are represented by avatars or other digital representations of themselves, allowing the participants to see and interact with each other within the VR environment. A VR classroom is a digital learning environment that uses VR technology to simulate a traditional classroom setting. The VR classroom enables students to immerse themselves in a virtual space and interact with a variety of content. In a traditional classroom setting, it is often difficult to experience complex concepts and scenarios. This problem is typically addressed with VR headsets displaying VR content students are required to learn. However, simply displaying VR content fails to supplement VR-based learning based on a topic of discussion and user preferences for a more immersive VR experience.

It may therefore be imperative to have a system in place to enable students to learn and grasp educational content through engaging and experiential learning. Thus, embodiments of the present invention may provide advantages including, but not limited to, dynamically converting a VR classroom into a smaller VR breakout session based on educational content, enabling students to learn and grasp educational content through engaging and experiential learning, and correlating educational content with real-world scenarios. The present invention does not require that all advantages need to be incorporated into every embodiment of the invention.

According to at least one embodiment, when participating in a VR collaboration, an educational content from a VR educational session and profiles of a plurality of users in the VR educational session may be received in order to identify a topic of the educational content. Upon identifying the topic of the educational content, a plurality of real-world use cases relevant to the identified topic may be extracted from a knowledge corpus based on the identified topic and the profiles so that it may be determined whether at least two users of the plurality of users have at least one overlapping learning preference based on the profiles. According to at least one embodiment, in response to determining the at least two users have the at least one overlapping preference, the at least two users having the at least one overlapping learning preference may be divided into a subgroup such that the VR educational session may be converted into a smaller VR breakout session containing at least one real-world use case conforming to the at least one overlapping learning preference of the at least two users in the subgroup. Then, the converted VR educational session may be displayed to the at least two users in the subgroup.

According to at least one other embodiment, in response to determining the at least two users do not have the at least one overlapping preference, the VR educational session may be converted into an individual VR breakout session for each user containing at least one real-world use case conforming to a learning preference of each user in order to display the converted VR educational session to each user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to extract a plurality of real-world use cases relevant to an identified topic from a knowledge corpus based on the identified topic and profiles of a plurality of users and, accordingly, in response to determining at least two users have at least one overlapping learning preference, converting a VR educational session into a smaller VR breakout session containing at least one real-world use case conforming to the at least one overlapping learning preference of the at least two users in a subgroup.

Referring to FIG. 1, an exemplary computing environment 100 is depicted, according to at least one embodiment. Computing environment 100 contains an example of an environment for the execution of at least some of the computer code involved in performing the inventive methods, such as a VR converter program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the VR converter program 150 may be a program capable of receiving educational content from a VR educational session and profiles of a plurality of users in the VR educational session, extracting a plurality of real-world use cases relevant to an identified topic from a knowledge corpus based on the identified topic and the profiles of the plurality of users, and converting the VR educational session into a smaller VR breakout session containing at least one real-world use case conforming to the at least one overlapping learning preference of at least two users in a subgroup, dynamically converting a VR classroom into the smaller VR breakout session based on the educational content. The VR converter program 150 may also be capable of enabling students to learn and grasp the educational content through engaging and experiential learning, and correlating the educational content with real-world scenarios. Furthermore, notwithstanding the depiction in computer 101, the VR converter program 150 may be stored in and/or executed by, individually or in any combination, end user device 103, remote server 104, public cloud 105, and private cloud 106. The VR conversion method is explained in further detail below with respect to FIG. 2. It may be appreciated that the examples described below are not intended to be limiting, and that in embodiments of the present invention the parameters used in the examples may be different.

Figure 2:
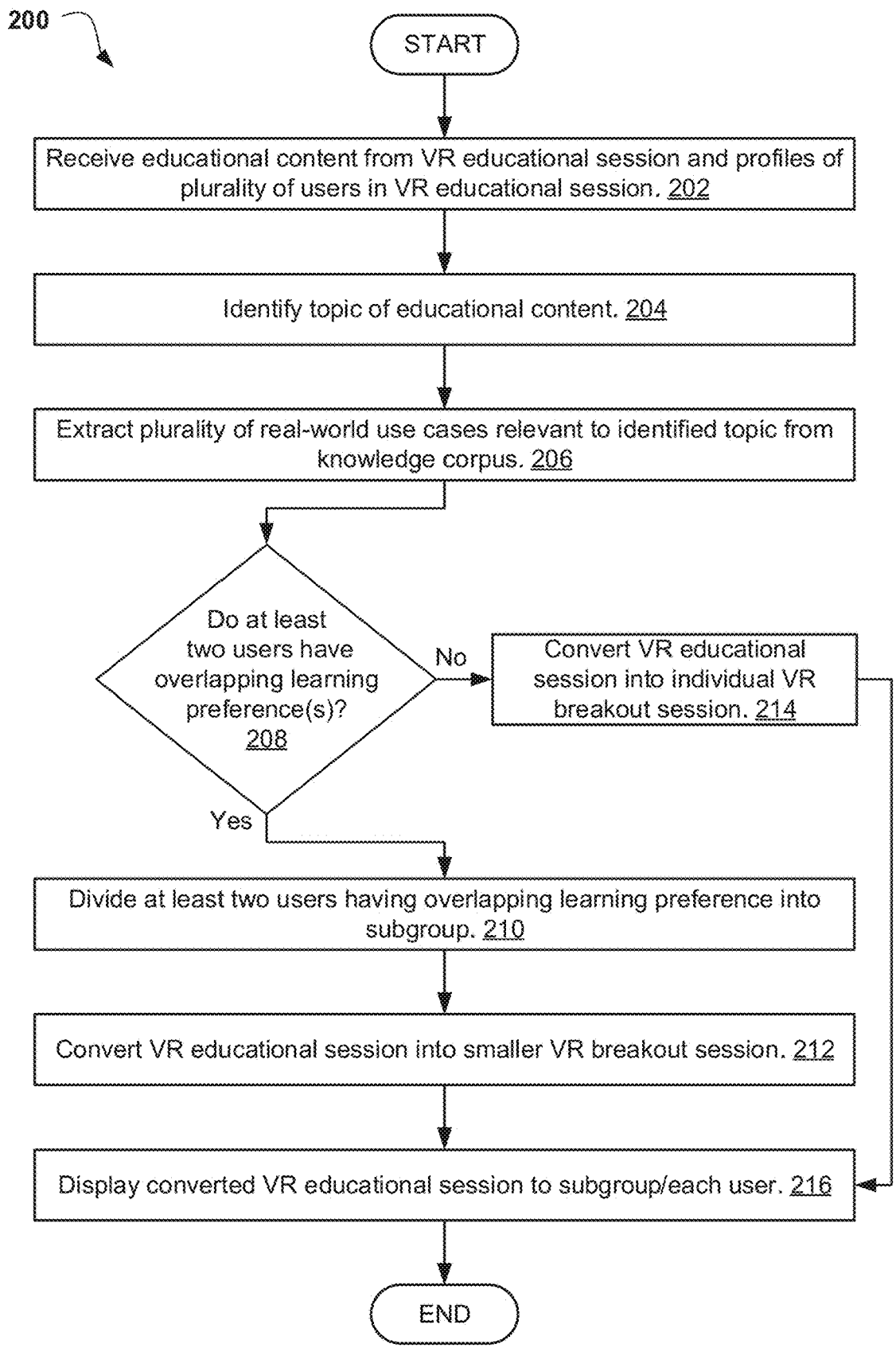
FIG. 2 illustrates an operational flowchart for dynamically converting a virtual reality (VR) classroom into a VR breakout session in a dynamic VR conversion process according to at least one embodiment.
Figure 3:
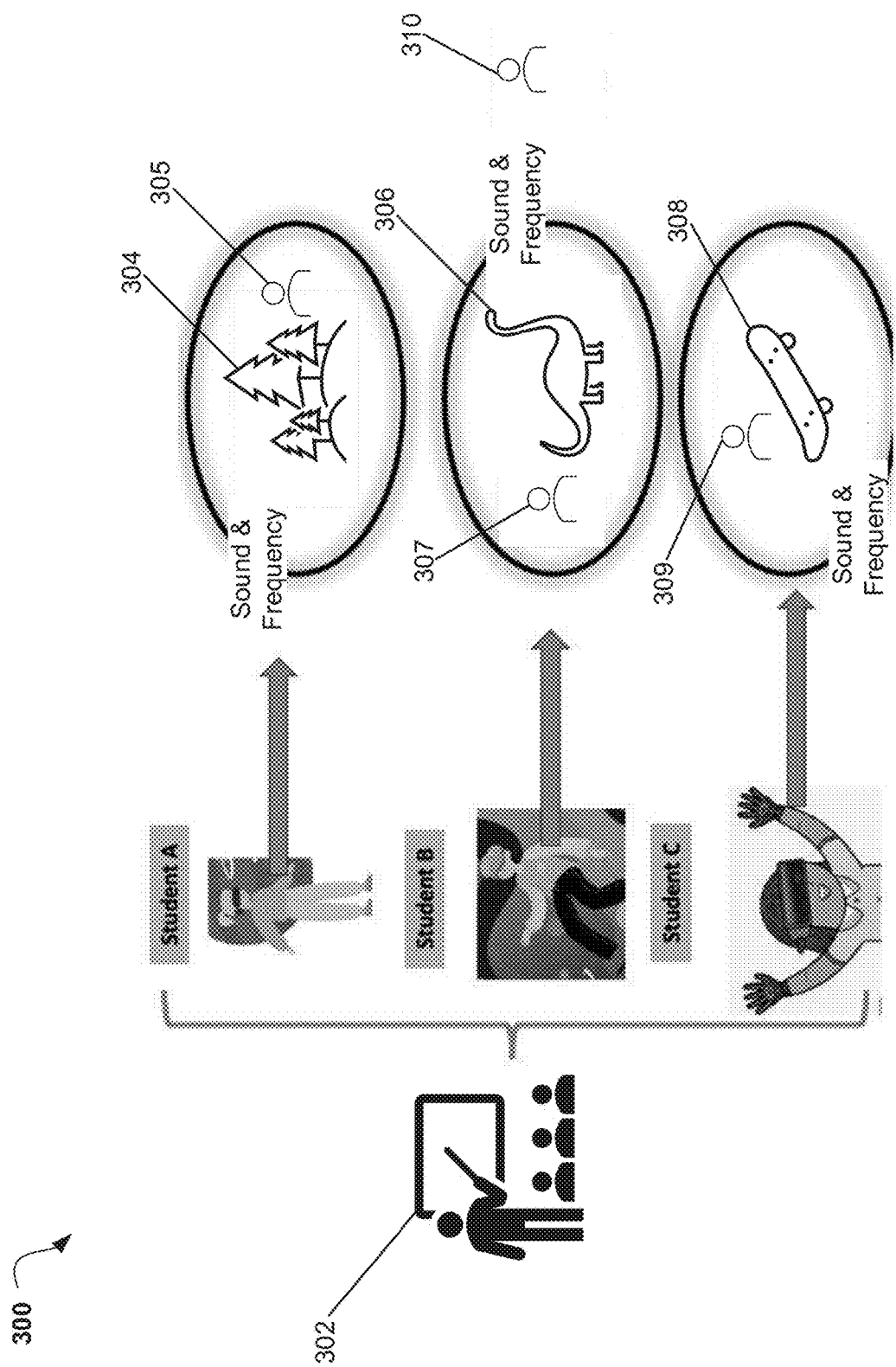
FIG. 3 is an exemplary diagram depicting a conversion of the VR classroom into a plurality of individual VR breakout sessions according to at least one embodiment.

Referring now to FIG. 2, an operational flowchart for dynamically converting a VR classroom into a VR breakout session in a dynamic VR conversion process 200 is depicted according to at least one embodiment. At 202, the VR converter program 150 receives the educational content from the VR educational session and the profiles of the plurality of users in the VR educational session. The VR educational session may be a VR version of a traditional classroom setting, where students (e.g., the users) are listening to a lecture by a teacher, as illustrated in FIG. 3. The educational content may include any information that could be taught in a classroom. For example, the educational content may include a lecture on sound, such as echo, frequency, and resonance. In another example, the educational content may include a lecture on the flow of electricity.

The profiles of the plurality of users may include avatars of the users, learning preferences and styles of the users, and/or VR environments visited by the users. The avatars of the users may be digital twin representations of the users having similar characteristics to that of the users on which the digital twin representations are based. For example, the avatars may have the same height, weight, and/or age as the users on which they are based. The learning preferences of the users may include topics of interest to the users. For example, user A may be interested in topics related to outer space (e.g., the planets), forests, plants, and books. Continuing the example, user B may be interested in forests, plants, and dinosaurs. Continuing the example, user C may be interested in skateboarding. The VR environments visited by the users may include, but are not limited to, web conferences, social interactions, and/or gaming environments. The profiles may be constructed from social network profiles and/or gaming profiles of the plurality of users.

Then, at 204, the VR converter program 150 identifies the topic of the educational content. Spoken content from a lecturer (e.g., a teacher) may be converted into text by one or more natural language processing techniques. Keyword extraction and topic analysis may then be utilized by the VR converter program 150 to determine the topic that is being explained. For example, in a lecture on sound, keywords may include echo, frequency, and resonance. Thus, in this example, the topic may be how sound travels in various conditions. In another example, in a lecture on electricity, keywords may include electricity, wires, lights, and circuits. Thus, in this example, the topic may be the flow of electricity through wires, lights, and circuits.

Next, at 206, the VR converter program 150 extracts the plurality of real-world use cases relevant to the identified topic from the knowledge corpus. The plurality of real-world use cases are extracted based on the identified topic and the profiles. The plurality of real-world use cases may be contained in the knowledge corpus, such as remote database 130, and may include supplemental educational content that can be displayed to one or more of the plurality of users. The plurality of real-world use cases may be working examples of the topic of the educational content.

For example, where the topic is how sound travels in various conditions, the plurality of real-world use cases may be working examples of sound. Where the plurality of users are collectively interested in forests, plants, dinosaurs, outer space, and skateboarding, the working examples of sound may include these interests. Continuing the example, the plurality of real-world use cases may include sound travelling in a forest, sounds made by a skateboard, sounds generated by dinosaurs in a prehistoric landscape, and/or sounds made in outer space.

In another example, where the topic is the flow of electricity through wires, lights, and circuits, the plurality of real-world use cases may be working examples of electric flow. Where the plurality of users are collectively interested in roller coasters, solar energy, and automobiles, the working examples of electric flow may include these interests. Continuing the example, the plurality of real-world use cases may include electricity flowing to power a roller coaster, electric flow in a solar panel, and/or electricity flowing from a battery to power the infotainment system of an automobile.

Then, at 208, the VR converter program 150 determines whether the at least two users of the plurality of users have the at least one overlapping learning preference. The determination is made based on the profiles of the plurality of users. As described above with respect to step 202, the learning preferences of the users may include topics of interest to the users. According to at least one embodiment, the learning preference of each user having the at least one overlapping learning preference, may be identified based on one or more VR environments visited by each user. For example, user A may visit a VR environment that takes place in the solar system. Continuing the example, based on the visited VR environment, the VR converter program 150 may identify that user A is interested in outer space. The learning preferences of the at least two users may overlap whenever the at least two users have at least one learning preference in common.

For example, the learning preference of user A may include topics related to outer space, forests, plants, and books. The learning preference of user B may include topics related to forests, plants, and dinosaurs. Since user A and user B have at least one learning preference in common (e.g., forests and plants), the VR converter program 150 may determine that the at least two users (e.g., user A and user B) have the at least one overlapping learning preference.

In another example, the learning preference of user A may include topics related to outer space, the learning preference of user B may include topics related to plants and dinosaurs, and the learning preference of user C may include topics related to skateboarding. Since user A, user B, and user C have no learning preferences in common, the VR converter program 150 may determine that the at least two users (e.g., from user A, user B, and user C) do not have the at least one overlapping learning preference.

In response to determining the at least two users have the at least one overlapping learning preference (step 208, "Yes" branch), the dynamic VR conversion process 200 proceeds to step 210 to divide the at least two users having the at least one overlapping learning preference into the subgroup. In response to determining the at least two users do not have the at least one overlapping learning preference (step 208, "No" branch), the dynamic VR conversion process 200 proceeds to step 214 to convert the VR educational session into the individual VR breakout session for each user.

Next, at 210, the VR converter program 150 divides the at least two users having the at least one overlapping learning preference into the subgroup. The subgroup may be created so that multiple users with similar learning preferences can be placed together in the smaller VR breakout session, described in further detail below with respect to step 212. As used herein, a similar learning preference means at least two users have at least one overlapping learning preference. For example, where user A and user B are the at least two users having the at least one overlapping learning preference, user A and user B may be divided into the subgroup. Continuing the example, where user C has no learning preferences in common with user A and user B, user C may not be placed into the subgroup.

Then, at 212, the VR converter program 150 converts the VR educational session into the smaller VR breakout session containing the at least one real-world use case conforming to the at least one overlapping learning preference of the at least two users in the subgroup. The VR breakout session may be smaller in that there are fewer users in the VR breakout session than in the VR educational session. In this manner, the VR educational session may be transformed into a virtual and personalized laboratory. It may be appreciated that in embodiments of the present invention, the plurality of real-world use cases may be identified by learning preferences of the plurality of users in the VR educational session collectively, whereas the at least one real-world use case may be identified by learning preferences of the at least two users in the subgroup.

For example, the two users in the subgroup may be user A and user B. Continuing the example, where the at least one overlapping learning preference of user A and user B is forests and plants, and where the topic is how sound travels in various conditions, the at least one real-world use case may include sound travelling in a forest, along with a variety of plants in the forest. In this example, the smaller VR breakout session may be a video of sound travelling in a forest with a variety of plants. In another example, the two users in the subgroup may be user A and user B. Continuing the example, where the at least one overlapping learning preference of user A and user B is automobiles, and where the topic is the flow of electricity through wires, lights, and circuits, the at least one real-world use case may include electricity flowing from a battery to power the infotainment system of an automobile. In this example, the smaller VR breakout session may be a video of the interior of an automobile with electricity flowing from a battery to power the infotainment system.

According to at least one embodiment, the smaller VR breakout session may include a plurality of avatars performing one or more interactions with the at least one real-world use case conforming to the at least one overlapping learning preference. For example, the plurality of avatars may interact with one or more icons on the infotainment screen of the automobile. In another example, the plurality of avatars may touch the plant life in the forest. The plurality of avatars may perform the one or more interactions independently of the at least two users, or the at least two users may interact with the at least one real-world use case along with the plurality of avatars. For example, where an avatar touches a first icon on the infotainment screen, a user in the real-world may touch a second icon. The plurality of avatars may be obtained from the profiles of the plurality of users, as described above with respect to step 202. According to at least one other embodiment, a total number of the plurality of avatars may correspond to a total number of users in the subgroup. For example, where user A and user B are the users in the subgroup, there may be two avatars in the smaller VR breakout session. According to a further embodiment, an avatar of the lecturer (e.g., the teacher) may be included in the smaller VR breakout session along with the avatars of the users in the subgroup.

According to at least one other embodiment, the plurality of avatars may perform the one or more interactions in the smaller VR breakout session synchronously with spoken content in the VR educational session. For example, the plurality of avatars may interact with one or more icons on the infotainment screen of the automobile when the lecturer says, "electricity flows through the most conductive path while powering devices." In another example, the plurality of avatars may make a noise in the forest when the lecturer says, "echo is produced by sounds reverberating off of objects."

According to at least one further embodiment, the VR educational session may be converted into the smaller VR breakout session via a generative adversarial network (GAN) model. The extracted keywords, sentences, and topics from the VR educational session may be fed into the GAN model as input. The GAN model may generate a series of images in an iterative process until a generator of the GAN model is able to fool a discriminator of the GAN model at least half the time. In any GAN, the goal of the GAN generator is to trick the GAN discriminator into classifying artificially generated (e.g., fake) images as real. The GAN discriminator may output a value between 0 and 1, where 0 indicates the GAN discriminator classifies the image as real, and 1 indicates the GAN discriminator classifies the image as fake. The series of images classified as real by the GAN discriminator may be stitched together to create the smaller VR breakout session.

Next, at 214, the VR converter program 150 converts the VR educational session into the individual VR breakout session for each user containing the at least one real-world use case conforming to the learning preference of each user. The individual VR breakout session may include a customized VR environment for each user, since no users have overlapping learning preferences. The VR educational session may be converted into the individual VR breakout session for each user in the same manner as described above with respect to step 212.

For example, the learning preference of user A may include topics related to outer space, the learning preference of user B may include topics related to dinosaurs, and the learning preference of user C may include topics related to skateboarding. Where the topic is how sound travels in various conditions, the at least one real-world use case for user A may include sounds made in outer space, the at least one real-world use case for user B may include sounds generated by dinosaurs in the prehistoric landscape, and the at least one real-world use case for user C may include sounds made by a skateboard in the skatepark.

According to at least one embodiment, each individual VR breakout session may include a single avatar performing one or more interactions with the at least one real-world use case conforming to the learning preference of each user. For example, a single avatar may interact with one or more icons on the infotainment screen of the automobile. In another example, the single avatar may touch the plant life in the forest. The single avatar may perform the one or more interactions independently of each user, or a single user may interact with the at least one real-world use case along with the single avatar. For example, where the single avatar touches a first icon on the infotainment screen, the single user in the real-world may touch a second icon. The avatar for each user may be obtained from the profiles of the plurality of users, as described above with respect to step 202.

According to at least one other embodiment, each avatar may perform the one or more interactions in the individual VR breakout session synchronously with spoken content in the VR educational session. For example, the single avatar may interact with one or more icons on the infotainment screen of the automobile when the lecturer says, "electricity flows through the most conductive path while powering devices." In another example, the single avatar may make a noise in the forest when the lecturer says, "echo is produced by sounds reverberating off of objects."

According to at least one further embodiment, the VR educational session may be converted into the individual VR breakout session via the GAN model in the same manner as described above with respect to step 212.

Then, at 216, the VR converter program 150 displays the converted VR educational session. According to at least one embodiment, where the at least two users have the at least one overlapping learning preference, the converted VR educational session is displayed to the at least two users in the subgroup. The converted VR educational session (e.g., the smaller VR breakout session) may be displayed to the at least two users by a VR headset and/or any other device capable of showing extended reality. For example, where the at least two users in the subgroup are user A and user B, the smaller VR breakout session may be displayed to user A and user B by the VR headset.

According to at least one other embodiment, where the at least two users do not have the at least one overlapping learning preference, the converted VR educational session (e.g., the individual VR breakout session) may be displayed to each user. The converted VR educational session (e.g., the individual VR breakout session) may be displayed to each user by the VR headset and/or any other device capable of showing extended reality. For example, one individual VR breakout session may be displayed to user C by the VR headset, and a different individual VR breakout session may be displayed to user D by the VR headset.

Referring now to FIG. 3, an exemplary diagram 300 depicting a conversion of the VR classroom 302 into a plurality of individual VR breakout sessions 304, 306, 308 is shown according to at least one embodiment. In the diagram 300, the VR classroom 302 (e.g., the VR educational session in FIG. 2) may include a discussion of sound and frequency. The VR classroom 302 may be converted into a first individual VR breakout session 304, a second individual VR breakout session 306, and a third individual VR breakout session 308. A first avatar 305 representing Student A may be participating in the first individual VR breakout session 304. The first individual VR breakout session 304 may contain a virtual demonstration of how sound and frequency travel in a forest in response to determining a learning preference of Student A includes forests. A second avatar 307 representing Student B may be participating in the second individual VR breakout session 306. The second individual VR breakout session 306 may contain a virtual demonstration of sound and frequency generated by a dinosaur in a prehistoric landscape in response to determining a learning preference of Student B includes dinosaurs. A third avatar 309 representing Student C may be participating in the third individual VR breakout session 308. The third individual VR breakout session 308 may contain a virtual demonstration of sound and frequency created by a skateboard in response to determining a learning preference of Student C includes skateboarding. According to at least one embodiment, a fourth avatar 310 representing a teacher may be included in the second individual VR breakout session 306.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically converting a virtual reality (VR) classroom into a VR breakout session, the method comprising:
   receiving educational content from a VR educational session and profiles of a plurality of users in the VR educational session;
   identifying a topic of the educational content;
   extracting a plurality of real-world use cases relevant to the identified topic from a knowledge corpus based on the identified topic and the profiles;
   determining whether at least two users of the plurality of users have at least one overlapping learning preference based on the profiles; and
   in response to determining the at least two users have the at least one overlapping learning preference:
      dividing the at least two users having the at least one overlapping learning preference into a subgroup;
      converting the VR educational session into a smaller VR breakout session containing at least one real-world use case conforming to the at least one overlapping learning preference of the at least two users in the subgroup, wherein converting the VR educational session into the smaller VR breakout session includes:
         feeding extracted keywords from the VR educational session into a generative adversarial network (GAN) model as input;
         iterating, until a generator of the GAN model is able to fool a discriminator of the GAN model at least a majority of a time, generating, by the GAN model, a series of images based on the extracted keywords; and
         stitching the series of images together to create the smaller VR breakout session;
      and
      displaying the converted VR educational session to the at least two users in the subgroup.

2. The computer-based method of claim 1, further comprising:
   in response to determining the at least two users do not have the at least one overlapping learning preference:
      converting the VR educational session into an individual VR breakout session for each user containing at least one real-world use case conforming to a learning preference of each user; and
      displaying the converted VR educational session to each user.

3. The computer-based method of claim 2, wherein the learning preference of each user, including the at least one overlapping learning preference, is identified based on one or more VR environments visited by each user.

4. The computer-based method of claim 1, wherein the smaller VR breakout session includes a plurality of avatars performing one or more interactions with the at least one real-world use case conforming to the at least one overlapping learning preference.

5. The computer-based method of claim 4, wherein a total number of the plurality of avatars corresponds to a total number of users in the subgroup.

6. The computer-based method of claim 4, wherein the plurality of avatars perform the one or more interactions in the smaller VR breakout session synchronously with spoken content in the VR educational session.

7. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving educational content from a VR educational session and profiles of a plurality of users in the VR educational session;
   identifying a topic of the educational content;
   extracting a plurality of real-world use cases relevant to the identified topic from a knowledge corpus based on the identified topic and the profiles;
   determining whether at least two users of the plurality of users have at least one overlapping learning preference based on the profiles; and
   in response to determining the at least two users have the at least one overlapping learning preference:
      dividing the at least two users having the at least one overlapping learning preference into a subgroup;
      converting the VR educational session into a smaller VR breakout session containing at least one real-world use case conforming to the at least one overlapping learning preference of the at least two users in the subgroup, wherein converting the VR educational session into the smaller VR breakout session includes:
    feeding extracted keywords from the VR educational session into a generative adversarial network (GAN) model as input;
    iterating, until a generator of the GAN model is able to fool a discriminator of the GAN model at least a majority of a time, generating, by the GAN model, a series of images based on the extracted keywords; and
    stitching the series of images together to create the smaller VR breakout session;
and
displaying the converted VR educational session to the at least two users in the subgroup.

8. The computer system of claim 7, the method further comprising:
    in response to determining the at least two users do not have the at least one overlapping learning preference:
    converting the VR educational session into an individual VR breakout session for each user containing at least one real-world use case conforming to a learning preference of each user; and
    displaying the converted VR educational session to each user.

9. The computer system of claim 8, wherein the learning preference of each user, including the at least one overlapping learning preference, is identified based on one or more VR environments visited by each user.

10. The computer system of claim 7, wherein the smaller VR breakout session includes a plurality of avatars performing one or more interactions with the at least one real-world use case conforming to the at least one overlapping learning preference.

11. The computer system of claim 10, wherein a total number of the plurality of avatars corresponds to a total number of users in the subgroup.

12. The computer system of claim 10, wherein the plurality of avatars perform the one or more interactions in the smaller VR breakout session synchronously with spoken content in the VR educational session.

13. A computer program product, the computer program product comprising:
    one or more computer-readable tangible storage medium and program instructions stored on at least one of the one or more computer-readable tangible storage medium, the program instructions executable by a processor capable of performing a method, the method comprising:
    receiving educational content from a VR educational session and profiles of a plurality of users in the VR educational session;
    identifying a topic of the educational content;
    extracting a plurality of real-world use cases relevant to the identified topic from a knowledge corpus based on the identified topic and the profiles;
    determining whether at least two users of the plurality of users have at least one overlapping learning preference based on the profiles; and
    in response to determining the at least two users have the at least one overlapping learning preference:
    dividing the at least two users having the at least one overlapping learning preference into a subgroup;
    converting the VR educational session into a smaller VR breakout session containing at least one real-world use case conforming to the at least one overlapping learning preference of the at least two users in the subgroup, wherein converting the VR educational session into the smaller VR breakout session includes:
        feeding extracted keywords from the VR educational session into a generative adversarial network (GAN) model as input;
        iterating, until a generator of the GAN model is able to fool a discriminator of the GAN model at least a majority of a time, generating, by the GAN model, a series of images based on the extracted keywords; and
        stitching the series of images together to create the smaller VR breakout session;
    and
    displaying the converted VR educational session to the at least two users in the subgroup.

14. The computer program product of claim 13, the method further comprising:
    in response to determining the at least two users do not have the at least one overlapping learning preference:
    converting the VR educational session into an individual VR breakout session for each user containing at least one real-world use case conforming to a learning preference of each user; and
    displaying the converted VR educational session to each user.

15. The computer program product of claim 14, wherein the learning preference of each user, including the at least one overlapping learning preference, is identified based on one or more VR environments visited by each user.

16. The computer program product of claim 13, wherein the smaller VR breakout session includes a plurality of avatars performing one or more interactions with the at least one real-world use case conforming to the at least one overlapping learning preference.

17. The computer program product of claim 16, wherein a total number of the plurality of avatars corresponds to a total number of users in the subgroup.

\* \* \* \* \*